(12) United States Patent
Solondz (10) Patent No.: US 6,259,730 B1
(45) Date of Patent: Jul. 10, 2001

(54) TRANSMIT DIVERSITY AND RECEPTION EQUALIZATION FOR RADIO LINKS

(75) Inventor: Max Aaron Solondz, Morris Township, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/188,563

(22) Filed: Nov. 10, 1998

(51) Int. Cl.[7] ........................................... H03H 7/30
(52) U.S. Cl. ..................... 375/232; 375/233; 375/347
(58) Field of Search .............................. 375/232, 233, 375/347; 708/323; 333/18, 28 R (56) References Cited

U.S. PATENT DOCUMENTS

| 5,283,780 | * | 2/1994 | Schuchman et al. ................ 455/65 |
| 5,692,018 | * | 11/1997 | Okamoto ............................ 375/347 |
| 5,757,853 | * | 5/1998 | Tsujimoto .......................... 375/200 |
| 5,859,870 | * | 1/1999 | Tsujimoto .......................... 375/200 |
| 5,982,825 | * | 11/1999 | Tsujimoto .......................... 375/347 |

* cited by examiner

Primary Examiner—Don N. Vo (57) ABSTRACT

In a mobile communication system, independent versions of a signal are transmitted over plural antennas. The antennas are either spatially separated or orthogonally polarized with respect to each other so that the independent versions of the signal are not subjected to correlated fading. Each independent version of the signal is transmitted from a respective antenna a fixed delay after transmission of a previous version of a signal from a different antenna. The fixed delay is at least one information bit of the signal. Received versions of the signal are equalized in an equalizer or RAKE architecture to provide a composite signal. The equalizer has respective sets of equalizer taps that are separated from adjacent sets of equalizer taps by the fixed delay. The RAKE architecture has respective sets of RAKE fingers that are separated from adjacent sets of RAKE fingers by the fixed delay.

15 Claims, 6 Drawing Sheets

TRANSMIT DIVERSITY AND RECEPTION EQUALIZATION FOR RADIO LINKS

FIELD OF THE INVENTION

1. Technical Field

The present invention relates to transmit diversity and reception equalization in a mobile communication system for reducing required transmitted power needed to achieve reliable communication.

2. Description of the Background Art

In duplex radio systems such as cellular telephone systems including a forward link and a reverse link, link balance must be maintained to ensure overall communication quality. Typically, reverse link receiver systems at a cellular base station employ diversity reception with two or more reception antennas spread 7–10λ so that fading of mobile station transmission as perceived by the base station can be mitigated. However, multiple antennas and receiver channels are not feasible for vehicle mounted or hand-held mobile communication devices in which small size and reduced cost are important. Since vehicle mounted or hand-held mobile communication devices can not employ reception diversity, uplink performance is typically 6–7 dB better than downlink performance. Conventionally, link balance is maintained by using a stronger base station downlink transmission power amplifier to make up for the lack of diversity reception at the mobile receiver to thus improve downlink performance. However, increased power transmission has negative impact on link power budget, component size, weight and cost and also results in increased system interference.

Figure 1:
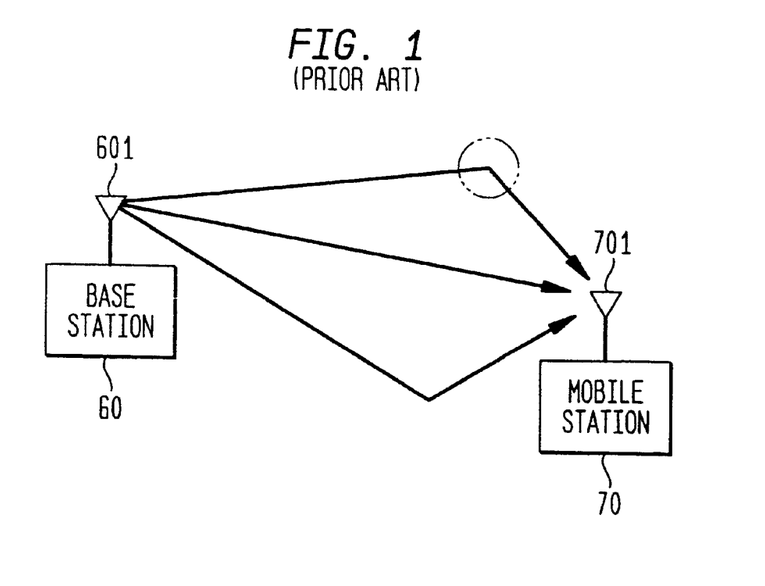
FIG. 1 illustrates a conventional mobile communication system including a base station having a single transmit antenna.
Figure 2:
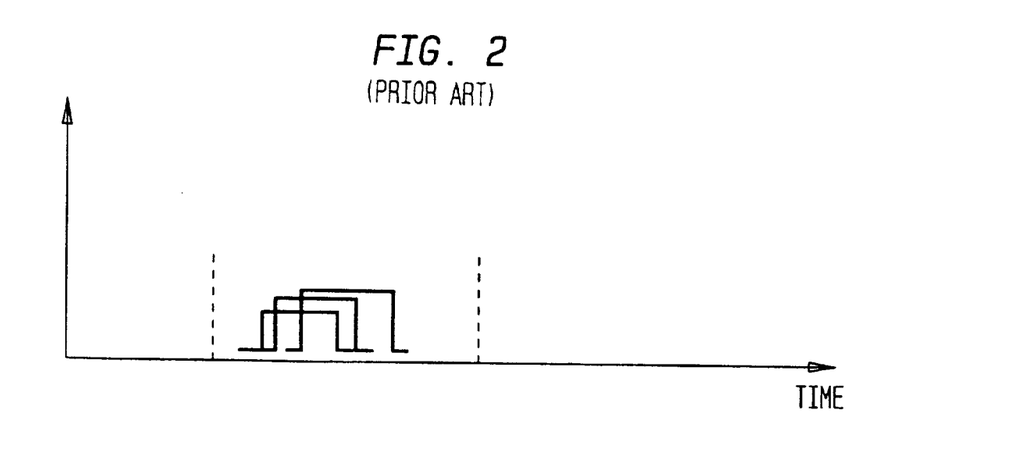
FIG. 2 illustrates multipaths of a signal received at the mobile station of FIG. 1 in the time domain.

FIG. 1 illustrates a conventional mobile communication system including base station 60 having a single base station transmit antenna 601 that wirelessly transmits a signal to mobile station 70 having antenna 701. Due to environmental obstacles such as buildings, trees or mountains located between mobile station 70 and base station 60, a signal transmitted from base station 60 will be received at mobile station 70 along with a plurality of multipath signals which are delayed in time after reflecting off various obstacles. FIG. 2 illustrates multipath delay of the received signal due to environmental obstacles. An adaptive equalizer within mobile station 70 has variable magnitude weightings and time offsets to compensate for changes in channel response due to motion of the mobile station which changes the geometry of signal reflections in the environment. Upon receiving a signal, the equalizer delays the multipaths of the received signal in an attempt to flatten the received channel response to compensate for radio channel distortions created by multipath. The equalizer functions in the frequency domain to adaptively mitigate the smearing of the multipaths.

In North American time division multiple access (TDMA) systems, which transmit narrow band signals of 30 kHz, the bit period is very long and the equalizer taps of the mobile station equalizer are separated by ¼ to 1 bit, which corresponds to multipath echoes from great distances. Since propagation delays from multipaths due to environmental obstacles are relatively short (typically ¼ of an information bit), mobile station equalizers in TDMA systems do not effectively mitigate multipaths caused by environmental reflections because most of the multipath is within delays that are too short for the equalizer to handle. In general, since mobile station equalizers in TDMA systems can not effectively mitigate multipath smearing, the equalizers are thus usually maintained in a differential mode (equalizer OFF). On the other hand, equalizer receivers in mobile stations of GSM (Global System for Mobile Communications) systems and RAKE receivers in mobile stations of CDMA (code division multiple access) systems may significantly mitigate multipath. However, the configuration of the equalizer receivers and RAKE receivers for GSM and CDMA systems are complex.

Figure 3:
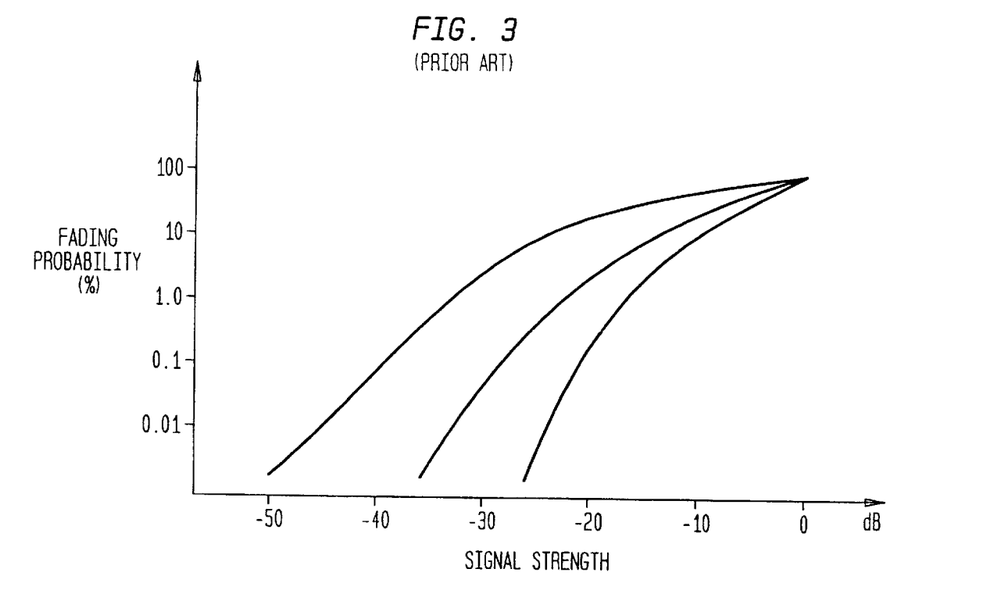
FIG. 3 illustrates the effects of receiver diversity for multiple branch reception.

FIG. 3 illustrates the effects of conventional diversity reception as plotted in terms of depth of fade with respect to fading probability. For example, in the case of one-branch reception using a single antenna, ten percent of the time the signal fade is 25dB or more. However, in the case of two-branch reception in which two signals are received using two different, independent antennas that are spatially separated at the base station such that the signal as received at the two antennas does not fade simultaneously, ten percent of the time the signal fade is 15dB of more. In the case of four-branch reception using four antennas, ten percent of the time the signal fade is 10dB or more. A diversity gain of 10dB is therefore realized for two-branch reception in contrast to one-branch reception using the same transmitted signal strength. The fade margin is less for two-branch reception in this case and link budget can therefore be conserved since a given reception criteria can be realized using lower signal strength and multiple reception branches. However, reception diversity at a mobile station is impractical since typical hand-held or portable mobile units cannot include multiple antennas that are spatially separated.

SUMMARY OF THE INVENTION

The present invention improves downlink performance in a mobile communication system without increasing base station transmit power by employing base station transmitter diversity combined with mobile station reception equalization. A multichannel transmitter including multiple transmit antennas transmits a signal and one or more additional independent versions of the same signal with time delay to a mobile station. The energy of the independent received versions of the signal are equalized in the frequency domain at the mobile station using an equalizer or synchronized in time in a RAKE receiver to produce a composite signal. The diversity gain effect may thus be achieved so that the fading immunity margin of the system is increased, less total transmitted power is required and generated interference is reduced.

DETAILED DESCRIPTION OF PREFERRED EMBODIMENTS

Figure 4:
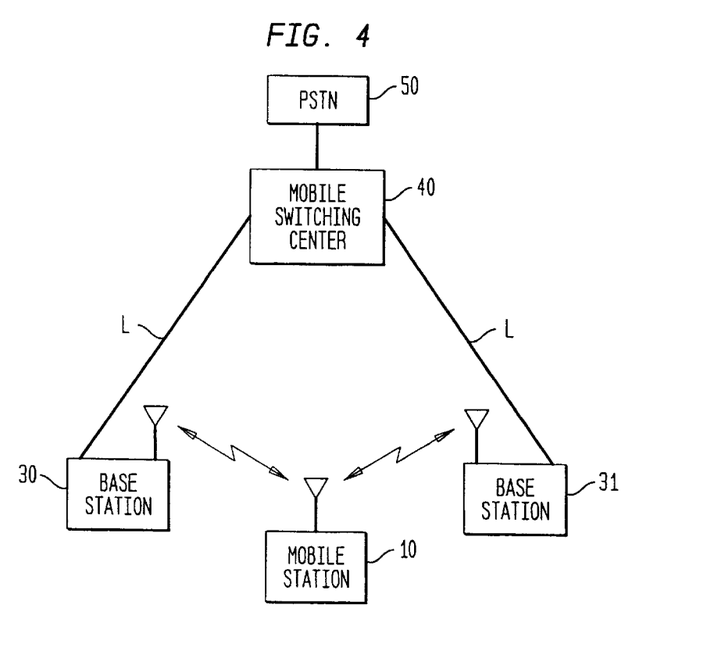
FIG. 4 illustrates a mobile communication system of an embodiment of the invention.

FIG. 4 illustrates a mobile communication system of a preferred embodiment of the invention which utilizes transmit diversity and reception equalization. The mobile communication system may be a TDMA, GSM or CDMA mobile communication system. As illustrated, the mobile communication system includes a plurality of base stations 30 and 31 which wirelessly transmit and receive communication signals to/from mobile station 10. Although not illustrated, each of base stations 30 and 31 may cover respective sectors. Mobile switching center 40 is connected to the plurality of base stations 30 and 31 via communication lines L and is further coupled to public switched telephone network (PSTN) 50 to enable communication between mobile station 10 and another party on PSTN 50. Although two respective base stations are illustrated, it is to be understood that the mobile communication system may include any number of base stations.

In order to achieve transmit diversity, two or more independent versions of the same signal are transmitted from base station 30 to mobile station 10 for example. As illustrated in greater detail in FIG. 5, in a preferred embodiment base station 30 includes two antennas 301 and 302 that are spatially separated horizontally by at least 7–10λ, wherein λ is wavelength. The antennas are spatially separated so that the independent versions of the same signal may be transmitted to mobile station 10 over different effective radio channels that are not subject to identical fading. In the alternative, each of antennas 301 and 302 may be spatially separated vertically. In a further embodiment, each of antennas 301 and 302 may be orthogonally polarized (vertical/horizontal dual polarization or dual slant polarization) with respect to each other to provide different independently fading transmissions. In a still further alternative, transmission independence may be provided through a combination of spatial separation and orthogonal polarization of antennas 301 and 302. Moreover, although only two antennas 301 and 302 are illustrated, the base station may transmit the independent versions of the same signal over any number of antennas to further improve the diversity effect.

Figure 5:
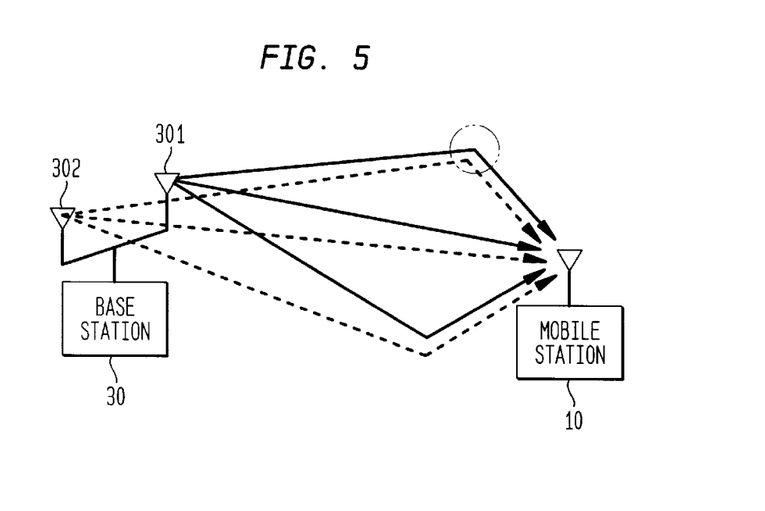
FIG. 5 illustrates transmit diversity of an embodiment of the invention at a base station including plural transmit antennas.

In order to effectively achieve the diversity effect, the independent versions of the signal transmitted from base station 30 and received by mobile station 10 must be separable from each other. In order to avoid RF energy of the independent versions of the transmitted signal from merely combining during transmission to form a combined signal received at mobile station 10 having random net phase sums and random net phase nulls, the independent versions of the transmit signals are transmitted from antennas 301 and 302 of base station 30 non-simultaneously. Accordingly, FIG. 5 illustrates a first independent version of the signal and the corresponding multipaths as transmitted from antenna 301 to mobile station 10 indicated by solid lines. FIG. 5 also illustrates a second independent version of the signal and the corresponding multipaths as transmitted from antenna 302 to mobile station 10 indicated by dashed lines, the second independent version being transmitted from antenna 302 a predetermined delay time Δ after transmission of the signal from antenna 301. In other words, the signal is transmitted from antenna 302 an artificial delay time after transmission of the signal from antenna 301.

Figure 6:
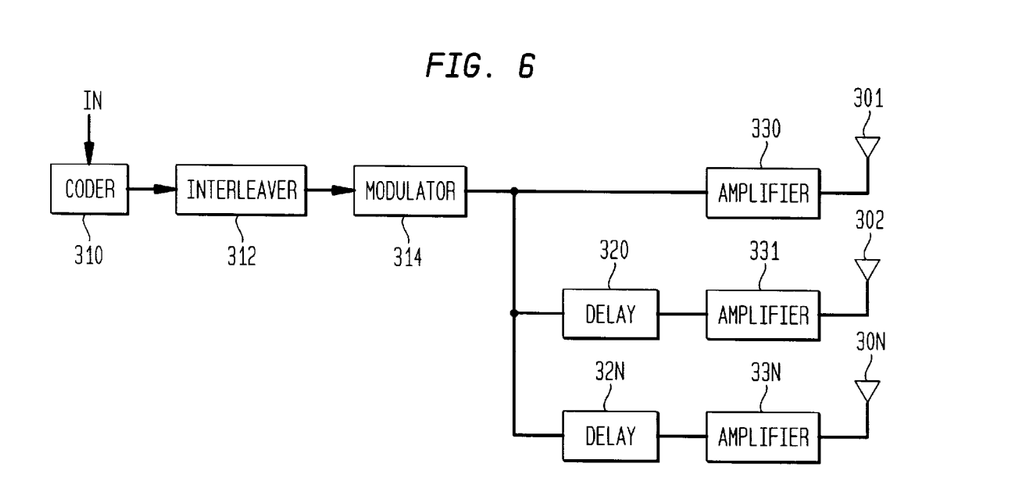
FIG. 6 illustrates a base station transmitter of an embodiment of the invention.

FIG. 6 illustrates the base station transmitter of base station 30 of FIG. 5 in greater detail. Input data or voice In is provided to coder 310. In TDMA and GSM mobile communication systems, coder 310 may perform pulse code modulation (PCM) for example. In a CDMA mobile communication system, coder 310 may be a variable-rate vocoder (video compression or data compression) using conventional coding algorithms as would be well within the level of ordinary skill. The coded signal is provided to interleaver 312 which interleaves the coded signal to mitigate the loss of entire blocks of data due to fading. The interleaved data is provided to modulator 314 which modulates the interleaved data using DQPSK (π/4 differential quadrature phase shift keying) for TDMA systems, GMSK (gaussian minimum shift keying) for GSM systems and QPSK (quadrature phase shift keying) for CDMA systems, for example.

The modulated signal output from modulator 314 is provided to amplifier 330 which amplifies the modulated signal and provides the amplified signal to antenna 301 for wireless transmission to mobile station 10. The modulated signal is also provided from modulator 314 to fixed delay element 320 which delays the modulated signal by a predetermined delay time Δ and then subsequently outputs the delayed signal. The predetermined delay time Δ is selected to be greater than one information bit period of the transmitted signal to prevent RF lobing where nulls are formed in the transmit pattern as in the case of simultaneous transmission from an array of antennas fed from a common source, and inter-symbol interference where the transition edges between digital states suffer time dispersion.

Amplifier 331 amplifies the delayed signal output from delay element 320 and provides the amplified signal to antenna 302 for wireless transmission to mobile station 10. Thus, the signal is transmitted from antenna 302 to mobile station 10 independently of and at a predetermined delay time Δ after transmission of the signal from antenna 301. The modulated signal is also provided to delay element 32N which delays the modulated signal by a predetermined delay time NΔ and then subsequently outputs the delayed signal. Amplifier 33N amplifies the delayed signal provided from delay element 32N and then provides the amplified signal to antenna 30N for wireless transmission to mobile station 10. Thus, the signal is transmitted from antenna 30N to mobile station 10 independently of and at a predetermined delay time NΔ after transmission of the signal from antenna 301. It is to be understood that N is an integer and that the number of transmission branches in the base station is not limited. The diversity effect improves as the number of transmission branches increases.

Figure 7:
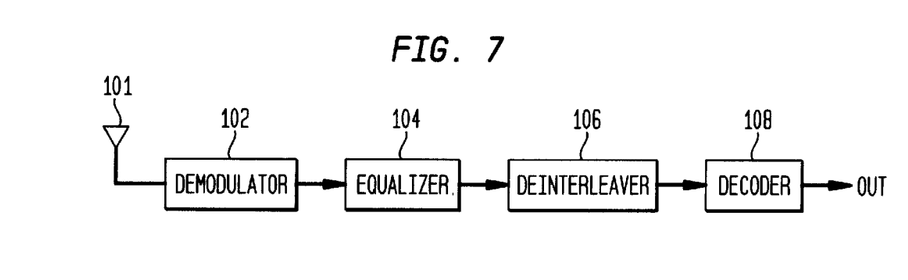
FIG. 7 illustrates a mobile station receiver of an embodiment of the invention.

FIG. 7 illustrates a preferred embodiment of a receiver of mobile station 10 of FIG. 4. Antenna 101 wirelessly receives the signals transmitted from antennas 301, 302 and 30N of the base station transmitter of FIG. 6. A signal as received is provided to demodulator 102 which demodulates the signal in accordance with the corresponding modulation scheme used at base station 30. For instance, DQPSK, GMSK and QPSK demodulation is carried out by demodulator 102 for TDMA, GSM and CDMA systems, respectively. The demodulated signal is provided to equalizer 104, which will be described in greater detail hereinafter, such that the independent versions of the signal as transmitted by antennas 301, 302 and 30N with delay may be combined to form a composite signal. The composite signal output from equalizer 104 is provided to de-interleaver 106 and is de-interleaved in a complimentary manner to the interleaving performed by interleaver 312 of the base station transmitter of FIG. 6. The de-interleaved signal is provided to decoder 108 which performs corresponding decoding to provide signal Out, which may be data or voice.

Figure 8:
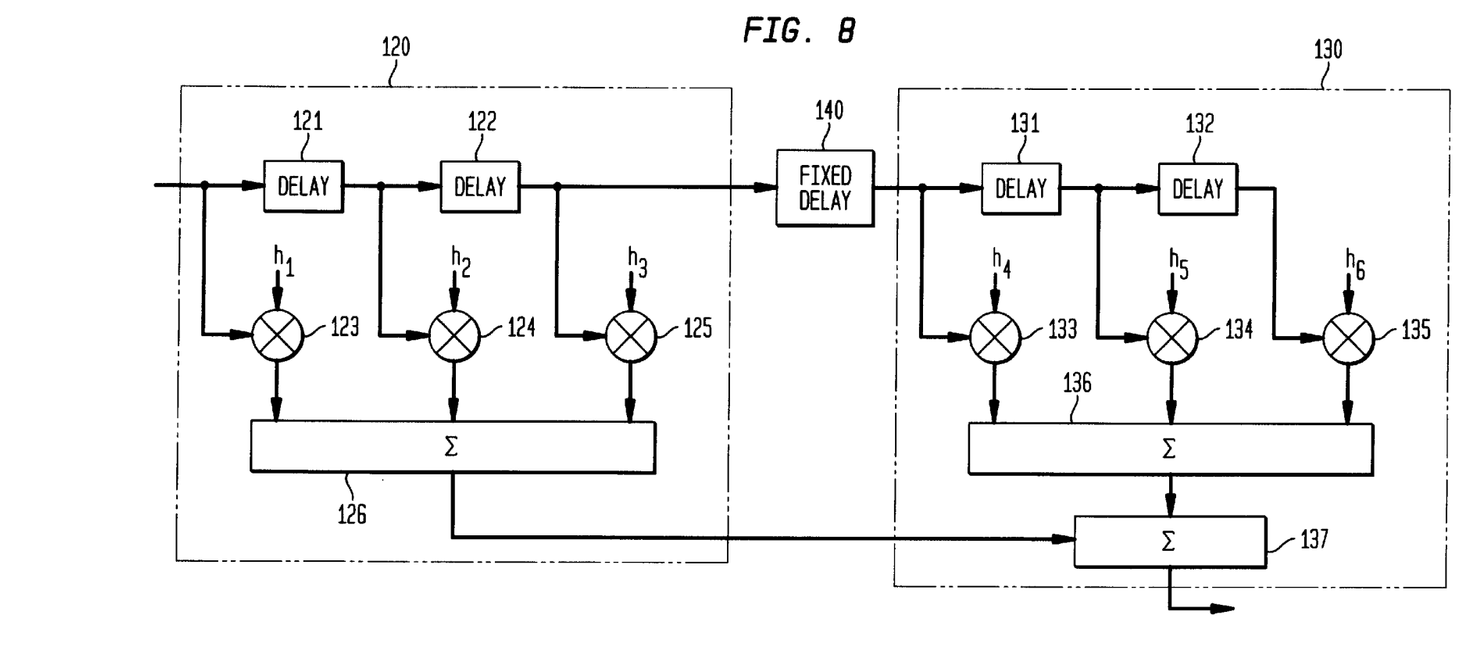
FIG. 8 illustrates an embodiment of an equalizer of the mobile station receiver of FIG. 7.

FIG. 8 illustrates an equalizer of a preferred embodiment of the invention for use in TDMA systems. Equalizer 104 is a split equalizer including equalizer portions 120 and 130 which are each three-tap adaptive equalizers. Fixed delay element 140 is included as coupled along the delay lines between equalizer portions 120 and 130. It is to be understood that FIG. 8 illustrates an example of an equalizer for a mobile station that receives two independent versions of a signal since two equalizer portions are implemented. Generally, equalizer 104 includes the same number of equalizer portions N as antennas N over which independent versions of the signal are transmitted from the base station. A respective fixed delay element 140 is coupled between each pair of equalizer portions.

The demodulated signal output from demodulator 102 of FIG. 7 is provided to fixed or variable delay element 121 and multiplier 123 of equalizer portion 120 of FIG. 8. Delay element 121 delays the demodulated signal by delay time $\tau_1$ and provides a delayed output to delay element 122 and multiplier 124. Delay element 122 further delays the output of delay element 121 by delay time $\tau_2$ and provides a delayed output to multiplier 125. Delay elements 121 and 122 form a tapped delay line and each provide delay of ¼, ½ or one full information bit period of the transmitted signal, but generally provide a much shorter delay than a full information bit period. The delayed output of delay element 122 is also provided to fixed long delay element 140 as a delayed output of equalizer portion 120. Each of multipliers 123, 124 and 125 respectively multiply the corresponding inputs by magnitude weightings $h_1$, $h_2$ and $h_3$. The magnitude weightings $h_1$, $h_2$ and $h_3$ are provided adaptively to equalize the signal in a conventional manner. The multiplied outputs of each of multipliers 123–125 are provided to summer 126 which sums the multiplied outputs to provide a summed output of equalizer portion 120 that is output to equalizer portion 130.

With regard to the delay elements 121 and 122 which form the tapped delay line in equalizer portion 120, in North American TDMA systems, the bit period is very long relative to the environmentally induced natural multipath echoes. A two-tap equalizer is the longest equalizer used in practice since the use of more taps produces no benefits. Typically, the delay between taps is as small as possible, usually ¼ of a bit period. Other equalizers may use ½ or one full bit delays between successive taps. Because of the long bit period in TDMA systems which corresponds inversely with the very narrow bandwidth of 30KHz, the ¼ bit period spaced second tap is relatively ineffective for compensating channel distortions and consequently less than 1 dB of gain is achieved. Accordingly, the TDMA equalizer is often turned off and differential detection is used instead without compensation for intersymbol interference. On the other hand, in GSM systems, the environmentally induced multipath echoes create severe intersymbol interference that must be compensated by an equalizer. In GSM systems, 5 to 8 tap equalizers are typically employed and effective gain is much greater than 10 dB of link budget improvement. For equalizer based channel compensation, the distortion produced due to multipath is analyzed in the frequency domain and the weights for the successive taps are set to create a flat response over the channel bandwidth.

Returning to the TDMA equalizer of FIG. 8, element 140 delays the delayed output of equalizer portion 120, as provided from delay element 122, by the predetermined delay time Δ described with reference to FIG. 6. Fixed long delay element 140 provides a delay of at least one information bit period, preferably two or three information bit periods of the transmitted signal, so that the independent versions of the received signal may be separated. The output of fixed long delay element 140 is provided to delay element 131 and multiplier 133 of equalizer portion 130. Delay element 131 delays the output of fixed delay element 140 by delay time $\tau_3$ and provides a delayed output to delay element 132 and multiplier 134. Delay element 132 delays the output of delay element 131 by delay time $\tau_4$ and provides a delayed output to multiplier 135. Delay elements 131 and 132 form a tapped delay line and provide delay as described previously with regard to delay elements 121 and 122. Multipliers 133, 134 and 135 respectively multiply the corresponding inputs by magnitude weightings $h_4$, $h_5$ and $h_6$ to provide corresponding multiplied outputs. As described previously, the magnitude weightings $h_4$, $h_5$ and $h_6$ are provided adaptively to equalize the signal in a conventional manner. The multiplied outputs of each of the multipliers 133–135 are provided to summer 136 which sums the multiplied outputs to provide a summed output that is output to summer 137. Summer 137 sums the summed output of equalizer portion 120 provided from summer 126 and the summed output of summer 136 to provide an equalizer output signal corresponding to the composite signal described with respect to FIG. 7 as output to de-interleaver 106. As can be appreciated in view of FIG. 8, fixed long delay element 140 separates the taps of the tapped delay line of equalizer portion 120 from the taps of the tapped delay line of equalizer portion 130 by the fixed delay.

As described previously, in order to achieve the transmitter diversity effect, the independent versions of the signal transmitted from base station 30 and received by mobile station 10 must be separable. Transmission of the independent versions of the signal with artificial delay from the base station transmitter as illustrated in FIG. 6 enables the independent versions to be separated upon reception. Use of a predetermined time delay Δ greater than one information bit period of the transmitted signal prevents RF lobing where nulls are formed in the transmit pattern as in the case of simultaneous transmission from an array of antennas fed from a common source, and inter-symbol interference where the transition edges between digital states suffer time dispersion. Accordingly, in a preferred embodiment of the invention, the predetermined delay time Δ is one information bit period of the transmitted signal. More preferably, the predetermined delay time Δ is at least two or three information bit periods of the transmitted signal.

As described with respect to FIG. 5, a signal transmitted from antenna 301 to mobile station 10 for example includes multipaths that are delayed due to the signal reflecting off environmental obstacles. The multipaths of a transmitted signal which occur due to environmental obstacles are illustrated in FIG. 2. Accordingly, the signal transmitted from antenna 301 of the base station transmitter is received first at mobile station 10 and is then provided to equalizer 104. The signal including the multipaths are provided to equalizer portion 120 of equalizer 104 illustrated in FIG. 8, which attempts to mitigate smearing of the multipaths to provide an equalized signal as an output of summer 126. The signal including the multipaths is provided from delay element 122 to fixed delay element 140 which delays the signal by the predetermined delay time Δ and subsequently provides the signal including the multipaths to equalizer portion 130 for equalization.

In view of the predetermined delay time Δ imparted by fixed delay element 140, the independent version of the signal transmitted by antenna 302 of the base station transmitter of FIG. 6 as delayed by delay element 320 and including multipaths, is received and provided to equalizer portion 120 at the same time the independent first transmitted version of the signal is provided from fixed delay element 140 to equalizer portion 130. Accordingly, at that given point in time, equalizer portion 130 attempts to mitigate smearing of the multipaths of the independent version of the signal transmitted from antenna 301 of the base station transmitter and equalizer portion 120 simultaneously attempts to mitigate smearing of the multipaths of the independent version of the signal transmitted from antenna 302 of the base station transmitter. The equalized independent versions of the signal as output from summers 126 and 136 are summed in summer 137 to provide the composite signal.

Figure 9:
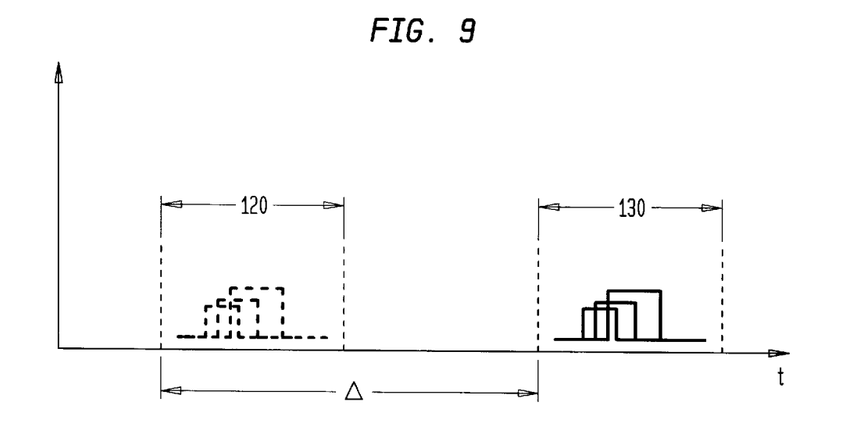
FIG. 9 is a graph illustrating the received multipaths of a first independent version of the signal transmitted without delay and received multipaths of a second independent version of the signal transmitted a predetermined delay time after transmission of the first version, as operated on in the equalizer portions of FIG. 8.

FIG. 9 illustrates the independent versions of the signal including multipaths as operated on by equalizer portion 120 and 130 of FIG. 8 at a corresponding point in time. The independent version of the signal that is first transmitted from antenna 301 of the base station transmitter and including multipaths is indicated by solid lines. At the corresponding point in time illustrated in FIG. 9, this independent version of the signal including multipaths is operated on by equalizer portion 130 as indicated. The independent version of the signal that is transmitted from antenna 302 of the base station transmitter and including multipaths is indicated by dashed lines. At the corresponding point in time illustrated in FIG. 9, this respective independent version of the signal including multipaths is operated on by equalizer portion 120. The independent versions of the signal as illustrated are separated by predetermined delay time Δ when transmitted and are thus operated on simultaneously by equalizer portions 120 and 130 which are separated from each other by fixed delay element 140.

Accordingly, an independent version of the signal is transmitted from antenna 302 predetermined delay time Δ after an independent version of the signal is transmitted from antenna 301. The independent versions of the signal may thus be separated as described above by equalizer 104 and may be combined to provide a composite signal. Moreover, the independent versions of the signal are transmitted from different antennas 301 and 302 that are either spatially separated and/or orthogonally polarized with respect to each other. The independent versions of the signal are thus transmitted over different paths and therefore are not subjected to correlated fading. The independent versions of the signal may thus be combined to provide a composite signal having effective signal strength greater than either of the independent versions of the signal due to the effects of diversity gain.

Figure 10:
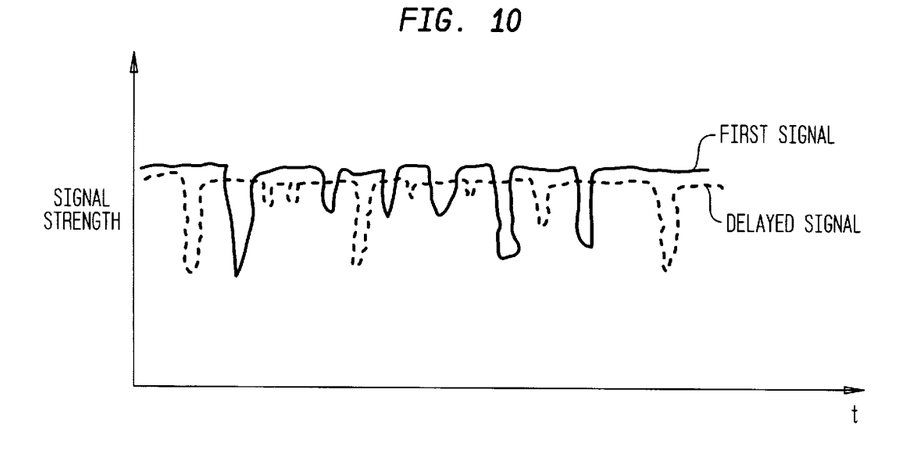
FIG. 10 illustrates independent fading of the independent versions of the signal.

As illustrated in FIG. 10, the independent version of the signal transmitted first from antenna 301 is subjected to different fading than the independent version of the signal transmitted a predetermined delay time Δ thereafter by antenna 302. When the independent versions of the signal are combined to provide a composite signal in equalizer 104, the net effect is more than simply adding the signal strength of the independent versions of the signal so that the composite signal has merely twice the signal strength of either of the independent versions of the signal taken alone. This mere doubling of the signal strength would correspond to a 3 dB increase. In view of transmitter diversity gain achieved in the present invention, the effective signal strength of the composite signal may actually be 6–15 or more dB stronger than that of either independent versions of the signal.

The mobile station receiver of FIG. 7 has been described as including equalizer 104 which is illustrated in greater detail in FIG. 8. The equalizer of FIG. 8 is described as a TDMA equalizer but may be used as a GSM equalizer by changing the number of taps, as described previously. In a further preferred embodiment of a mobile communication receiver for CDMA systems, equalizer 104 of FIG. 7 is replaced with specialized RAKE architecture 200 illustrated in FIG. 11. In general, RAKE architectures for CDMA systems experience multipath induced channel distortions. However, the bandwidth of CDMA systems is very wide, corresponding to a very short bit period, and the environmental induced echoes are very far apart in terms of numbers of bits. The intersymbol interference spans many bits in the CDMA systems, rather than just two adjacent bits for TDMA systems or eight adjacent bits for GSM systems as described previously. The system architecture therefore uses variable time delays between a small number of RAKE fingers to avoid complex equalizer design with hundreds or thousands of taps, most of which would be set to magnitude zero. Accordingly, in a RAKE based CDMA system, only the top three or four effective echoes are tracked, synchronized and summed to form a compensated signal. The scanning function for choosing the variable delays is done in the time domain to identify the delay offsets where the echoes reside.

Figure 11:
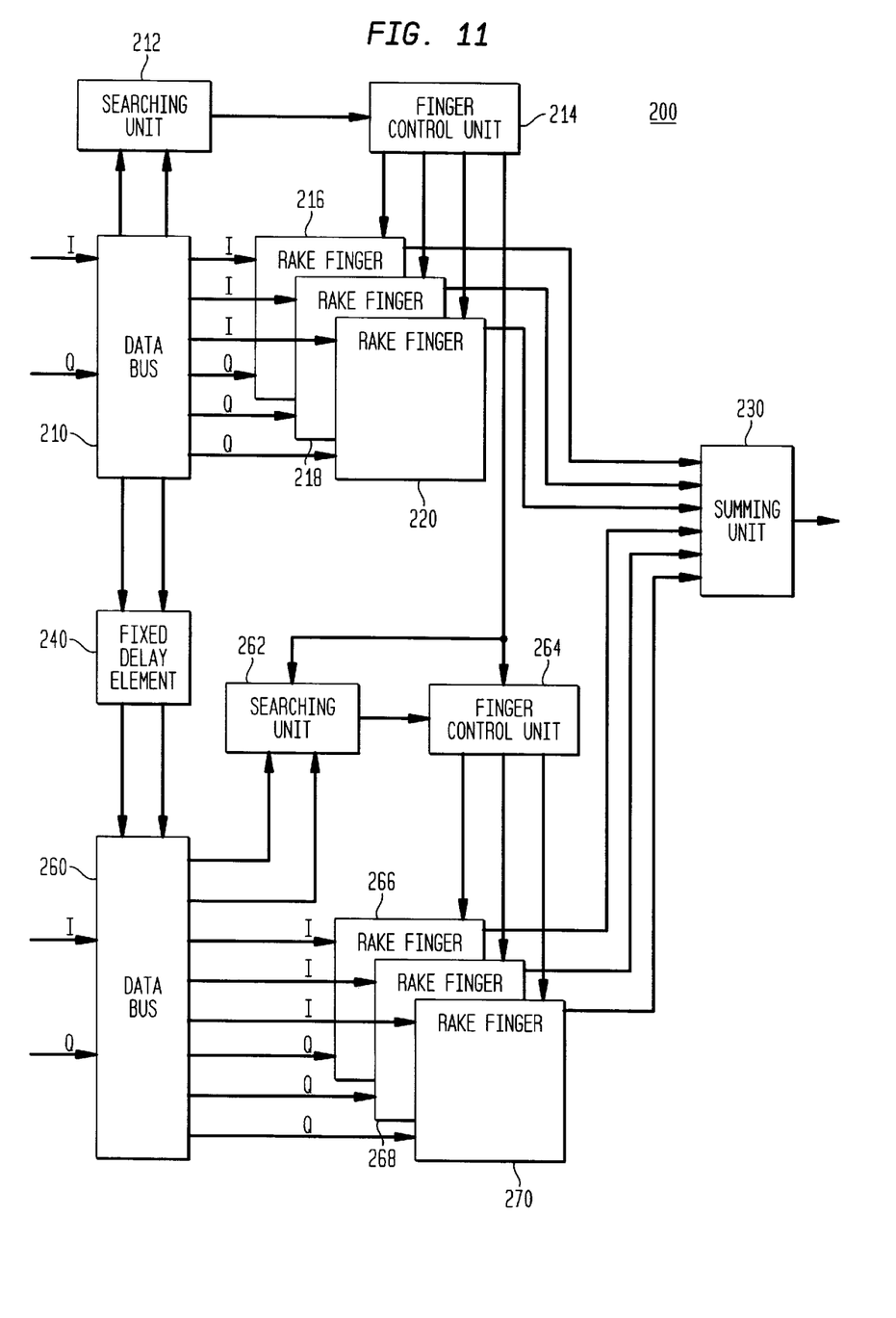
FIG. 11 illustrates a RAKE architecture of an alternative embodiment of the mobile station receiver of FIG. 7.

In greater detail as illustrated in FIG. 11, demodulated I and Q components are input to data bus 210 of RAKE architecture 200. The I and Q signal components are provided from data bus 210 to searching unit 212 which searches out the echoes of the received signal based on the I and Q signal components. Searching unit 212 provides an indication of where the echoes are in the received signal to finger control unit 214 which provides control signals to RAKE fingers 216, 218 and 220. RAKE fingers 216, 218 and 220 are each coupled to the I and Q signal components provided along data bus 210 and each delay a respective echo of the received signal by a specific delay in accordance with the control signals provided from finger control unit 214. RAKE fingers 216, 218 and 220 are thus adaptive to delay the respective multipath echoes of a received signal as illustrated in FIG. 2 so that the outputs of RAKE fingers 216, 218 and 220 as provided to summer 230 include respective echoes of the received signal that are synchronized with each other in time to effectively mitigate smear.

The I and Q components are also provided from data bus 210 to fixed delay element 240 which delays the I and Q components by the predetermined delay time Δ. The delayed I and Q signal components are provided from fixed delay element 240 to data bus 260. The I and Q signal components are provided from data bus 260 to searching unit 262. Searching unit 262, finger control unit 264 and RAKE fingers 266, 268 and 270 function similarly as searching unit 212, finger control unit 214 and rake fingers 216, 218 and 220 respectively. Finger control unit 214 provides a control signal to searching unit 262 and finger control unit 264 to coordinate searching and finger control based on the indication of where the echoes of the signal are located as determined by searching unit 212. RAKE fingers 266, 268 and 270 are thus adaptive to provide outputs to summer 230 which include respective echoes of the received signal that are synchronized with each other in time to mitigate smear. Summer 230 of RAKE architecture 200 provides a summed output to a de-interleaver which provides a de-interleaved output to a decoder. In the CDMA system of this particular embodiment, the decoder may be a Viterbi soft decoder for example.

A signal transmitted from antenna 301 of base station 30 of FIG. 5 is demodulated by the corresponding demodulator which provides I and Q signal components of the signal to data bus 210 of RAKE architecture 200. The signal including the multipaths are processed by the set of RAKE fingers 216, 218 and 220 to mitigate smearing. The I and Q components of the received signal are then delayed by fixed delay element 240 and then provided to data bus 260 to be processed by the set of RAKE fingers 266, 268 and 270. At this particular time, the independent version of the signal transmitted from antenna 302 of FIG. 5 (as demodulated by the corresponding demodulator) is provided as I and Q signal components to data bus 210. The I and Q components of the delayed independent version of the signal including the multipaths transmitted from antenna 302 are processed by the set of RAKE fingers 216, 218 and 220 simultaneously as the set of RAKE fingers 266, 268 and 270 process the I and Q signal components of the signal transmitted from antenna 301. The outputs of the RAKE fingers are provided to summer 230 which outputs a composite signal having effective signal strength greater than either of the independent versions of the signal due to the effects of diversity gain.

It is to be understood that the RAKE architecture 200 of FIG. 11 illustrates an example for a mobile station that receives two independent versions of a signal as transmitted from a base station since two sets of RAKE fingers are implemented. Generally, RAKE architecture 200 includes the same number of RAKE finger sets as antennas over which independent versions of the signal are transmitted from the base station. A respective fixed delay element 240 is coupled between each pair of RAKE finger sets. It is to be further understood that the searching units, finger control units and RAKE fingers are typical RAKE architecture elements.

The invention should not be limited in view of the corresponding figures and description thereof. For example, the equalizer of FIG. 8 can be simplified for certain types of environments. For a TDMA environment that uses a narrow effective band with a 30 KHz for instance, there is little delay spread in the environment because the bit period is very long. For such a specific case, the equalizer of FIG. 8 can be reduced to a single two-tap equalizer wherein equalizer portion 120 includes only multiplier 123 as a first fixed tap and equalizer portion 130 includes only multiplier 133 as a second fixed tap. The simplified equalizer would not include delay elements 121, 122, 131 and 132 and multipliers 124, 125, 134 and 135. Only fixed delay element 140 would be implemented between equalizer portions 120 and 130, thus simplifying the equalizer such that weight, size and cost may be reduced.

What is claimed:

1. A mobile station of a mobile communication system comprising:

an antenna for receiving multiple versions of a signal transmitted at least twice with a fixed delay between each transmission, the fixed delay being at least one information bit of the signal; and an equalizer for equalizing each version of the signal received by said antenna to provide a composite signal, said equalizer having respective sets of equalizing taps each being separated from an adjacent set of equalizing taps by the fixed delay.

2. The mobile station of claim 1, wherein said equalizer comprises:

a first equalizing portion for delaying the received signal in a first tapped delay line, multiplying delayed signals provided from a set of equalizing taps of the first tapped delay line with first weighting coefficients to provide first multiplied signals and summing the first multiplied signals to provide a first equalized signal;

a fixed delay element for delaying an output of the first tapped delay line by the fixed delay; and a second equalizing portion for delaying an output of said fixed delay element in a second tapped delay line, multiplying delayed signals provided from a set of equalizing taps of the second tapped delay line with second weighting coefficients to provide second multiplied signals, summing the second multiplied signals to provide a second equalized signal and summing the first and second equalized signals to provide the composite signal.

3. The mobile station of claim 1, wherein the signal is transmitted to the mobile station independently from a plurality of antennas of a base station of the mobile communication system.

4. The mobile station of claim 3, wherein the signal is transmitted from a first of the plurality of antennas of the base station and is transmitted independently from an nth antenna of the plurality of antennas the fixed delay after transmission of the signal from an (n–1) antenna of the plurality of antennas, n being an integer greater than 1.

5. The mobile station of claim 3, wherein the plurality of antennas of the base station are spatially separated by 7–10λ.

6. The mobile station of claim 3, wherein the plurality of antennas of the base station are orthogonally polarized with respect to each other.

7. The mobile station of claim 3, wherein the plurality of antennas of the base station are spatially separated and orthogonally polarized with respect to each other.

8. A method of communication diversity for a mobile station comprising the steps of:

receiving multiple versions of a signal transmitted at least twice with a fixed delay between each transmission, the fixed delay being at least one information bit of the signal; and equalizing each version of the received signal using an equalizer having respective sets of equalizer taps each being separated from an adjacent set of equalizing taps by the fixed delay to provide a composite signal.

9. The method of communication diversity of claim 8, wherein said step of equalizing comprises:

delaying the received signal in a first tapped delay line;

multiplying delayed signals provided from a set of equalizing taps of the first tapped delay line with first weighting coefficients to provide first multiplied signals;

summing the first multiplied signals to provide a first equalized signal;

delaying an output of the first tapped delay line by the fixed delay to provide a first signal;

delaying the first signal in a second tapped delay line;

multiplying delayed signals provided from a set of equalizing taps of the second tapped delay line with second weighting coefficients to provide second multiplied signals;

summing the second multiplied signals to provide a second equalized signal; and summing the first and second equalized signals to provide the composite signal.

10. The method of communication diversity of claim 8, wherein the signal is transmitted to the mobile station independently from a plurality of antennas of a base station.

11. The method of communication diversity of claim 10, wherein the signal is transmitted from a first of the plurality of antennas of the base station and is transmitted independently from a nth antenna of the plurality of antennas the fixed delay after transmission of the signal from an (n−1) antenna of the plurality of antennas, n being an integer greater than 1.

12. The method of communication diversity of claim 10, wherein the plurality of antennas of the base station are spatially separated by 7–10λ.

13. The method of communication diversity of claim 10, wherein the plurality of antennas of the base station are orthogonally polarized with respect to each other.

14. The method of communication diversity of claim 10, wherein the plurality of antennas of the base station are spatially separated and orthogonally polarized with respect to each other.

15. A method, of transmitting signals in a wireless communications system, comprising:

transmitting a first version of an input signal from a first antenna;

transmitting a second version of said input signal from a second antenna independently of the transmission from the first antenna;

receiving the transmitted first and second versions of the input signal with a fixed delay between each transmission, the fixed delay being at least one information bit of the signal; and equalizing the received first and second versions of the input signal using an equalizer having respective sets of equalizer taps each being separated from an adjacent set of equalizing taps by the fixed delay to provide a composite signal.

\* \* \* \* \*